(12) United States Patent
Aldazabal Badiola (10) Patent No.: US 10,252,868 B2
(45) Date of Patent: Apr. 9, 2019

(54) UNIVERSAL AUTOMATED STACKING DEVICE

(71) Applicant: BIELE, S.A., Azpeitia (ES)

(72) Inventor: Francisco Javier Aldazabal Badiola, Azpeitia (ES)

(73) Assignee: BIELE, S.A., Azpeitia (Guipuzcoa) (ES)

(*) Notice: Subject to any disclaimer, the term of this patent is extended or adjusted under 35 U.S.C. 154(b) by 0 days.

(21) Appl. No.: 15/271,467

(22) Filed: Sep. 21, 2016

(65) Prior Publication Data
US 2017/0081134 A1    Mar. 23, 2017

(30) Foreign Application Priority Data

Sep. 22, 2015 (ES) .................. 201531349

(51) Int. Cl.
| | | |
|---|---|---|
| *B65G 47/90* | (2006.01) | |
| *B65G 57/00* | (2006.01) | |
| *B65G 61/00* | (2006.01) | |
| *B25J 15/00* | (2006.01) | |
| *B25J 15/02* | (2006.01) | |
| *B65G 57/11* | (2006.01) | |
| *B65G 15/12* | (2006.01) | |

(52) U.S. Cl.
CPC .......... *B65G 47/90* (2013.01); *B25J 15/0061* (2013.01); *B25J 15/0293* (2013.01); *B65G 57/00* (2013.01); *B65G 57/11* (2013.01); *B65G 61/00* (2013.01); *B65G 15/12* (2013.01)

(58) Field of Classification Search
CPC ........ B65G 47/90; B65G 57/00; B65G 61/00; B65G 15/12; B25J 9/1687
USPC ........... 414/788.1; 294/81.2, 81.62; 198/586, 198/840, 841
See application file for complete search history.

(56) References Cited

U.S. PATENT DOCUMENTS

| | | | | |
|---|---|---|---|---|
| 4,563,031 A | * | 1/1986 | Kishimoto ................ | B66C 1/62 294/81.21 |
| 4,754,867 A | * | 7/1988 | De Anda ................ | B65G 43/08 198/464.2 |
| 5,193,973 A | * | 3/1993 | Tubke .................... | B65G 57/00 108/52.1 |
| 6,012,568 A | * | 1/2000 | Kane ...................... | B65G 21/10 198/817 |
| 6,032,788 A | * | 3/2000 | Smithers ............ | H05K 13/0069 198/817 |
| 7,399,019 B2 | * | 7/2008 | Malmgren .............. | B66C 1/663 294/81.2 |

(Continued)

*Primary Examiner* — Lynne E Schwenning
(74) *Attorney, Agent, or Firm* — The Webb Law Firm (57) ABSTRACT

The object of the invention refers to a universal automated stacking device comprising a pre-stacking table (1) and a claw (2) such that the pre-stacking table (1) comprises at least one support assembly (13) and at least one side centering device (14) attached to a chassis (12), and the claw (2) comprising at least one pair of pliers (3) attached to a frame (7), the at least one support assembly (13) being attached to at least one chassis guide (12) with capacity of displacing over the guides (20, 21), and the at least one pair of pliers (3) being fixed to the frame (7) via an arm (4) which is attached to a crossbar (5) with capacity of displacing over a rail (6) of the frame (7), and each arm (4) being attached to a slide (8) of the crossbar (5) with capacity of displacing through the slide (8).

5 Claims, 6 Drawing Sheets

(56) References Cited

U.S. PATENT DOCUMENTS

| | | | |
|---|---|---|---|
| 7,909,159 B1* | 3/2011 | Zats | B65G 21/10 |
| | | | 198/586 |
| 2003/0159906 A1* | 8/2003 | Rinks | B65G 15/12 |
| | | | 198/586 |
| 2005/0008471 A1* | 1/2005 | Garcia | B65G 47/53 |
| | | | 414/788 |
| 2005/0265817 A1* | 12/2005 | Blanc | B65G 57/24 |
| | | | 414/799 |
| 2015/0028608 A1* | 1/2015 | Wubbelmann | B66C 1/447 |
| | | | 294/81.2 |
| 2015/0063970 A1* | 3/2015 | Bianchi | B65G 57/005 |
| | | | 414/789.5 |

\* cited by examiner

UNIVERSAL AUTOMATED STACKING DEVICE

CROSS-REFERENCE TO RELATED APPLICATIONS

This application claims priority to Spanish Patent Application No. P201531349 filed Sep. 22, 2015, the disclosure of which is hereby incorporated in its entirety by reference.

OBJECT OF THE INVENTION

The present invention refers to a stacking device that is automatically adapted to the shape and dimensions of any piece intended to be stacked. It may be applied to any industry wherein a piece-stacking stage is required and mainly to the manufacturing industry where sheets obtained from cutting lines are stacked.

BACKGROUND OF THE INVENTION

Usually, in industries that work with pieces which are cut, once the material coming from a coil has been cut, it is necessary to stack the pieces obtained.

The stacking may be carried out by transporting the pieces until they are positioned on a pallet where centering devices subsequently center them, or otherwise, without the above-mentioned centering devices thus affecting the shape quality of the stack obtained. The first system has been used with pieces that are stacked in a single stack per pallet, and to stack two or three stacks per pallet, but in this case, the stacking speed is reduced and the positions are limited due to the access of the centering devices to the stacking position. The stacking may also be carried out by free fall, such that the material falls freely in some guided systems, allowing the stacking of pieces.

Finally, there are robots in the market that also perform the stacking of pieces upon exiting the cutting machine, said robots are well suited for stacking pieces of small and irregular dimensions, wherein the stacking by means of centering devices is not applicable.

The systems employed by stacking robots require pre-stacking tables, where the pieces exiting the cutting stage are positioned by free fall, and, afterwards, the pieces are lifted by the robot's claws which transport them to the pallet as far as their stacking position, where by repeating this process, a stack of pieces is formed.

Further, in the robot systems, there are two options: the first is to transport the pieces one by one, thus restricting the stacking capacity, since stacking the pieces one by one requires either to wait for the robot to complete a cycle for transporting a new piece to the stack or to have another robot working in the series; and, the second option is waiting for a package of pieces to be created in a centering table to transport the package of pieces to the stacking pallet. During the creation of the package, the centering devices center the pieces to improve the quality of the subsequent stack.

In the robots transporting the package of pieces that have been previously stacked, the claws transporting the packages of pieces and the centering devices of the centering table in which the packages are formed, are manually configured to adapt to the shape of the different pieces.

It takes certain time to perform said manual configuration and to perform a series of in-line tests, therefore, it is usual to have a plurality both of centering devices and of claws tailored to the piece exchanged in the robot, such that it is not necessary to conduct configuration tests. However, this procedure requires a considerable economic investment, as well as having space to store the sets of centering devices and claws.

DESCRIPTION OF THE INVENTION

The invention disclosed herein comprises a universal and automated stacking device that allows the adaptation to various geometries pieces without changing any elements of the device.

The universal automated stacking device comprises a pre-stacking table and a claw. The pre-stacking table at least comprises one support assembly attached to a chassis and at least one side centering device, and the claw comprises at least one pair of pliers attached to a frame.

In the universal automated stacking device which is the object of the invention, the at least one support assembly is attached to at least one guide to be selected among a lead guide and a rear guide of the chassis, such that each support assembly is capable of displacing on the chassis guide.

Additionally, in the universal automated stacking device which is the object of the invention, the at least one pair of pliers is fixed to the frame by via an arm that is attached to a crossbar which in turn is attached to a rail located in the lower part of the frame, and each arm is attached to a slide of the crossbar, such that each crossbar is capable of displacing through the rail displacing the pair of pliers, and the arms are capable of displacing through the slide displacing the pliers of each pair.

In the universal automated stacking device which is the object of the invention, each pair of pliers comprises a lower abutment and an upper abutment joined through a pneumatic cylinder to modify the distance between the lower abutment and the upper abutment.

In the universal automated stacking device which is the object of the invention, each support assembly comprises a conveyor belt that comprises at least one belt, a support arm and a lower beam wherein both the conveyor belt and the support arm are supported, such that the support assemblies are attached to the guides by means of the lower beam.

To displace the support assemblies along the guides, the universal automated stacking device which is the object of the invention comprises engines whose sole aim is to allow for said displacement in cooperation with several spindles.

The support arm of each support assembly comprises at least one support abutment whose position may be modified along said support arms to be adapted to the different widths of the pieces and to contribute with the centering of each piece on the support arm, the modification of the support abutment position being carried out by an engine.

The side centering devices comprise an attachment piece attached to a lead guide of the chassis, a thrust head and a lifting mechanism for the thrust head relative to the attachment piece.

In the universal automated stacking device which is the object of the invention, each side centering device is displaced along the lead guide by means of engines and a transmission system, and, thus the position of the side centering devices is adapted to different lengths of the pieces to be stacked.

In the universal automated stacking device, both the pre-stacking table and the claw are connected to an automated control device which may be a computer, a numerical control, which stores different positions of the pliers of the claw, of the support assemblies and of the side centering devices of the pre-stacking table.

DESCRIPTION OF THE FIGURES

To complete the description and in order to give a better understanding of the characteristics of the invention, this descriptive report is accompanied by a series of drawings that are an integral part of the report, wherein, for illustration purposes and without limitation, the following has been represented.

The different numerical references featured in the figures correspond to the following elements:
1.—pre-stacking table,
2.—claw,
3.—pliers,
4.—arm,
5.—crossbar,
6.—rail,
7.—frame,
8.—slide,
9.—lower abutment,
10.—upper abutment,
11.—pneumatic cylinder,
12.—chassis,
13.—support assembly,
14.—side centering device,
15.—conveyor belt,
16.—belt,
17.—support arm,
18.—lower beam,
19.—support abutment,
20.—front guide,
21.—rear guide,
22.—engine to displace the support assemblies,
23.—attachment piece,
24.—lead guide,
25.—thrust head,
26.—lifting mechanism,
27.—engine to displace the side centering devices,
28.—transmission system,
29.—engine for the support abutments.

DETAILED DESCRIPTION OF THE INVENTION

As indicated, and as it may be appreciated in the figures, the object of the invention is a universal and automated stacking device that allows it to adapt to the different geometries of the pieces without requiring any change in the elements of the device.

The device object of the invention comprises a pre-stacking table (1) and a claw (2), and both the pre-stacking table (1) and the claw (2) comprise a plurality of actuations to adapt its components to the different dimensions of the pieces to, in the case of the pre-stacking table (1), make the package of said pieces, and, in the case of the claw (2), fasten said package to be carried to create the stack on a pallet.

Figure 1:
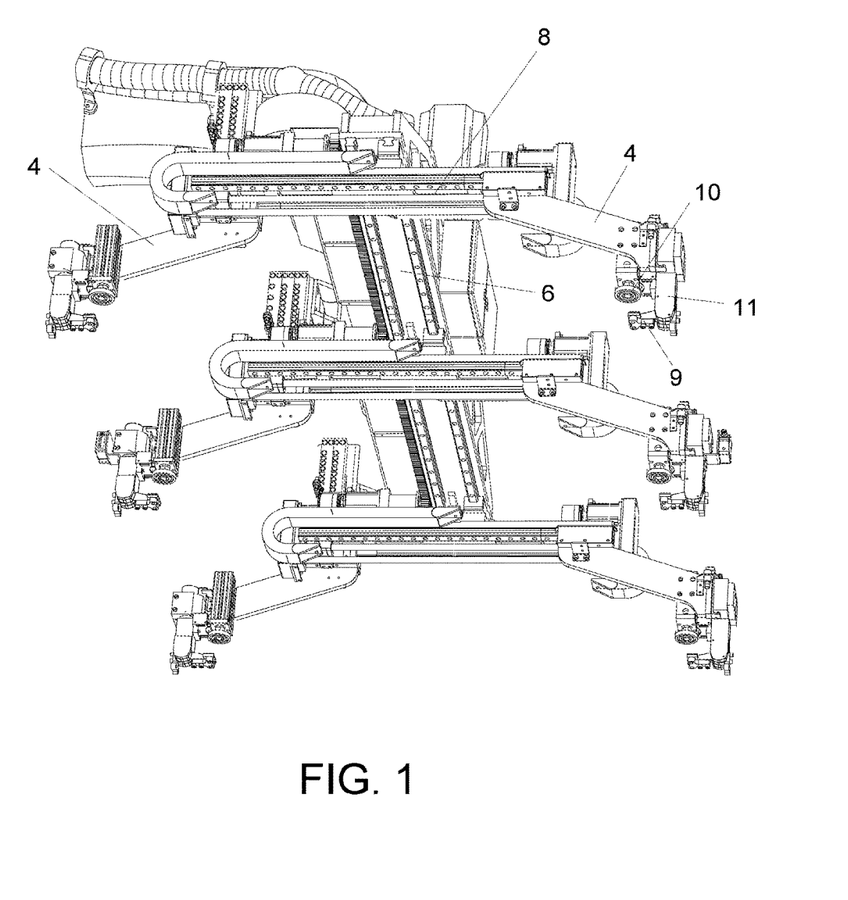
FIG. 1 is a perspective view of the bottom of the claw of the stacking device which is the object of the invention.
Figure 2:
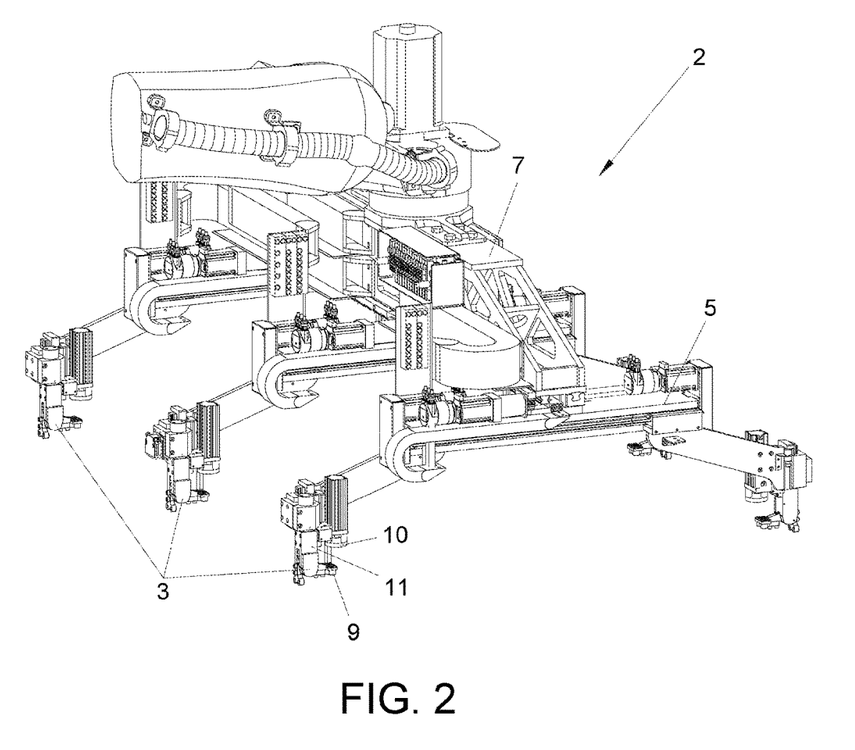
FIG. 2 is a perspective view of the upper part of the claw of the stacking device which is the object of the invention.

The claw (2) of the device which is the object of the invention comprises three pairs of pliers (3), each pair of pliers (3) being in parallel position to each other and aligned on a frame (7) attaching the pair of pliers (3) to a robot.

Each pair of pliers (3) is fixed to an arm (4) which is attached to a crossbar (5) that is in turn attached to a rail (6) located in the lower part of the frame (7) such that the crossbar (5) is displaced throughout the rail (6). Likewise, each crossbar (5) is attached to a spindle that in turn is connected to an engine, allowing for the crossbars (5) to approach and move away from each other, and such displacement also making the pairs of pliers (3) displace in parallel, approaching and moving away, to adapt to the different lengths of the pieces.

Likewise, the pliers (3) that form each pair may approach and move away from each other to adapt to the different widths of the pieces to be displaced, that is the pliers (3) may be displaced throughout the crossbar (5). For the displacement of the pliers (3) throughout the crossbar (5), each arm is attached to a slide (8) of the crossbar (5) and, by means of a spindle and an engine, each arm (4) may be displaced through the crossbar (5) guided by the slide (8).

Finally to define the claw (2) of the device which is the object of the invention, each pliers (3) is a pneumatic device, which comprises a lower abutment (9) and an upper abutment (10) attached to a pneumatic cylinder (11) that modifies the distance between the lower abutment (9) and the upper abutment (10) to adapt to the different widths of the sheet packages.

To summarize, the claw (2) of the device which is the object of the invention offers the possibility of adapting to three dimensions (length, width and height) of a sheet package to be stacked, by a relative displacement of all of the components in an automated way.

Figure 3:
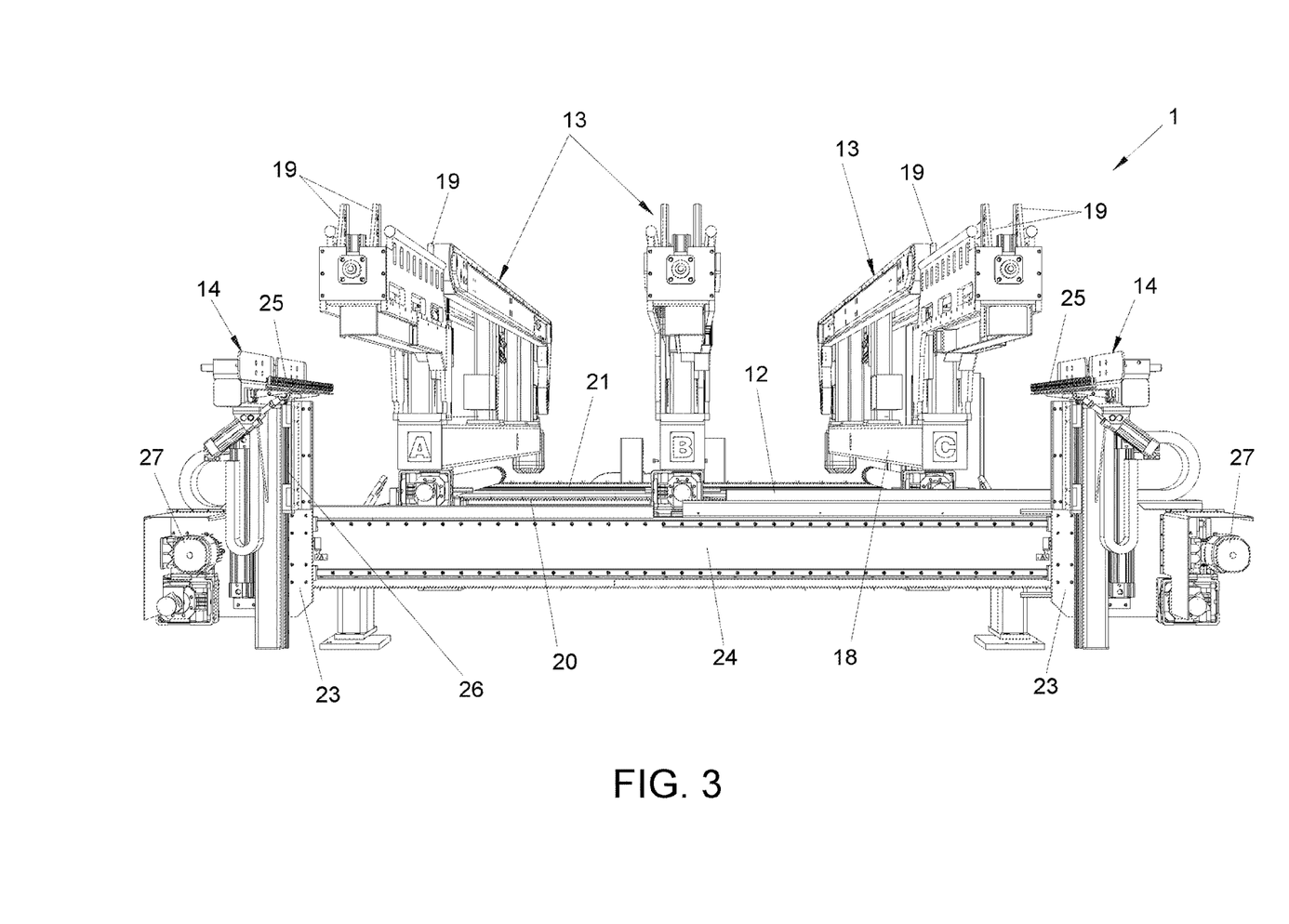
FIG. 3 is a front perspective view of the pre-stacking table of the stacking device which is the object of the invention.
Figure 4:
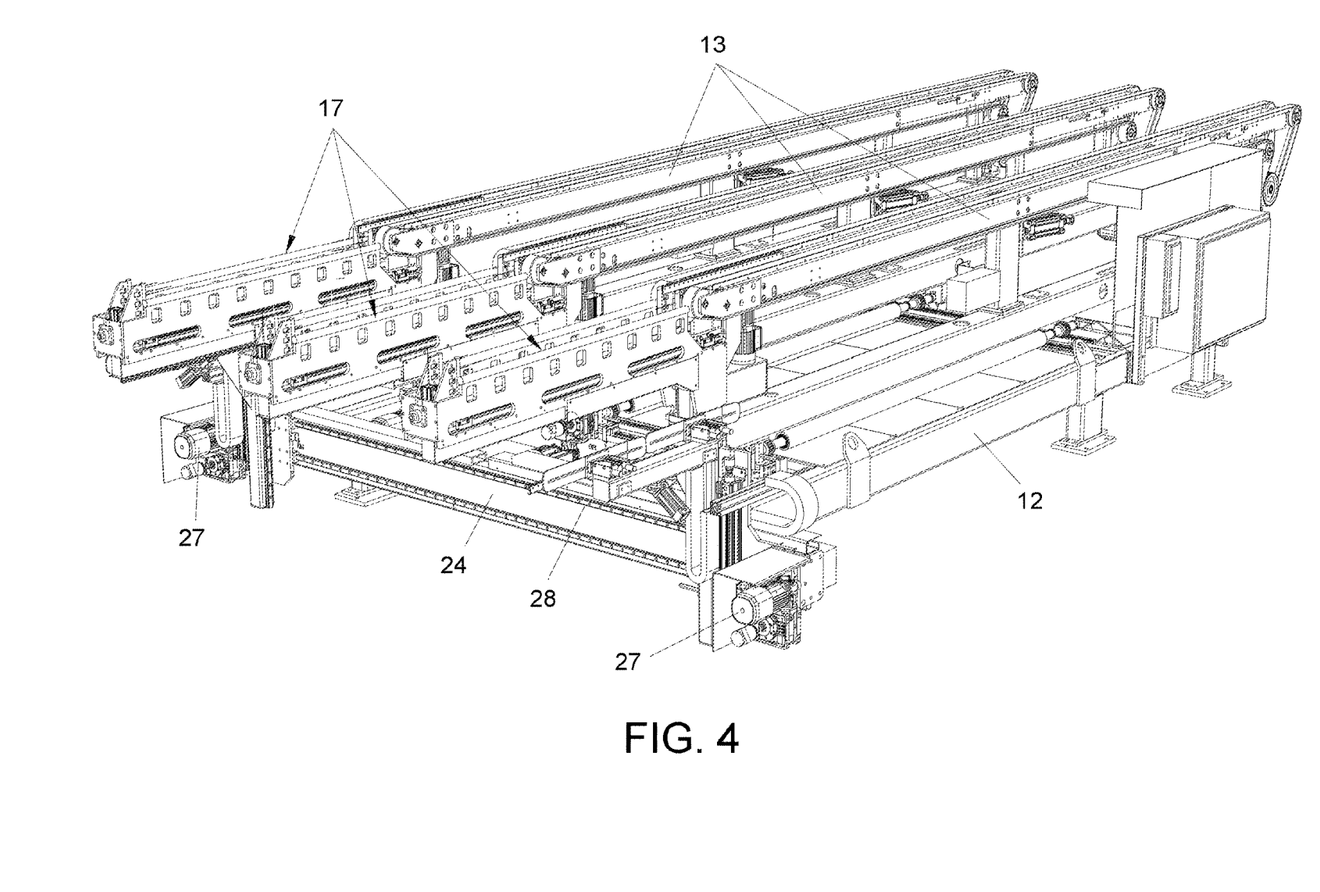
FIG. 4 is a side perspective view of the pre-stacking table of the stacking device which is the object of the invention.

The pre-stacking table (1) comprises a chassis (12) onto which three support assemblies (13) are located, which are the ones making the package of pieces and that, later on are stacked in a pallet by means of the claw (2), and two side centering devices (14) which align the package of pieces on the support assemblies (13).

Figure 5:
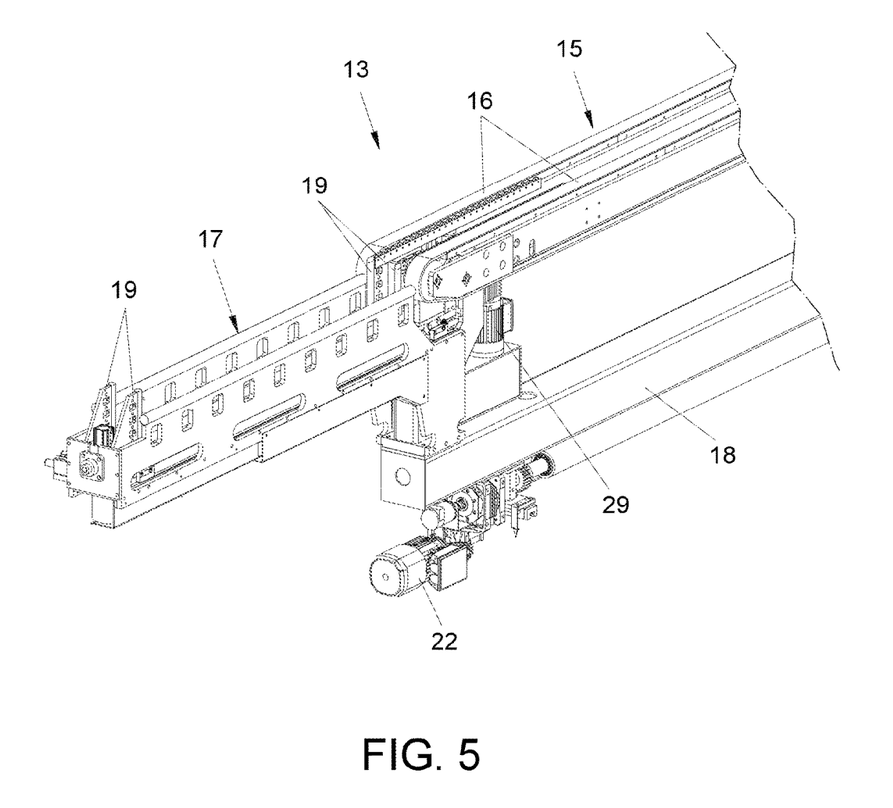
FIG. 5 is a detailed view of part of a support assembly, highlighting the support arm.

Each support assembly (13) comprises a conveyor belt (15), formed by two belts (16) parallel to each other, a support arm (17) and lower beam (18) in which both the conveyor belt (15) and the support arm (17) are supported.

The support arm (17) comprises two groups of support abutments (19) capable of being positioned throughout said support arms (17) to be adapted to different widths of the pieces and contribute to the centering of each piece on the support arm (17).

The support abutments (19) are moved by an engine (29) and a spindle located in each support assembly (13). The engine (29) may be shared by the support abutments (19) and by the belts (16), this configuration requiring a clutch to make the movement of the two elements independent or that the support abutments (19) include their own engines, and the belts (16), their own.

The support assemblies (13) are capable of displacing on the chassis (12) to adapt to the different lengths of the pieces, such that the lower beam (18) is supported on a front guide (20) and on a rear guide (21) incorporated on the chassis (12), and the support assemblies (13) are displaced along the guides (20, 21) via engines (22).

The side centering devices (14) comprise an attachment piece (23) to attach said centering devices (14) to a lead guide (24) located in the chassis (12), a thrust head (25) and a lifting mechanism (26) for the thrust head (25) relative to the attachment piece (23). The side centering devices (14) are displaced along the lead guide (24) via their own engines (27) and their own transmission system (28), such that the side centering devices (14) are adapted to different lengths of the pieces located on the support arms (17).

The fact that the side centering devices (14) are provided with a lifting mechanism (26) of the thrust head (25) is due to the different configurations offered by the pre-stacking table (1), since it is possible that the side centering devices (14) are found outside the support assemblies (13), but it is also possible that said side centering devices (14) are located between two support assemblies (13), for which it is necessary to lower the thrust head (25) until it travels below the support arms (17) and, afterwards, lift said thrust head (25) to return to its position.

Figure 6:
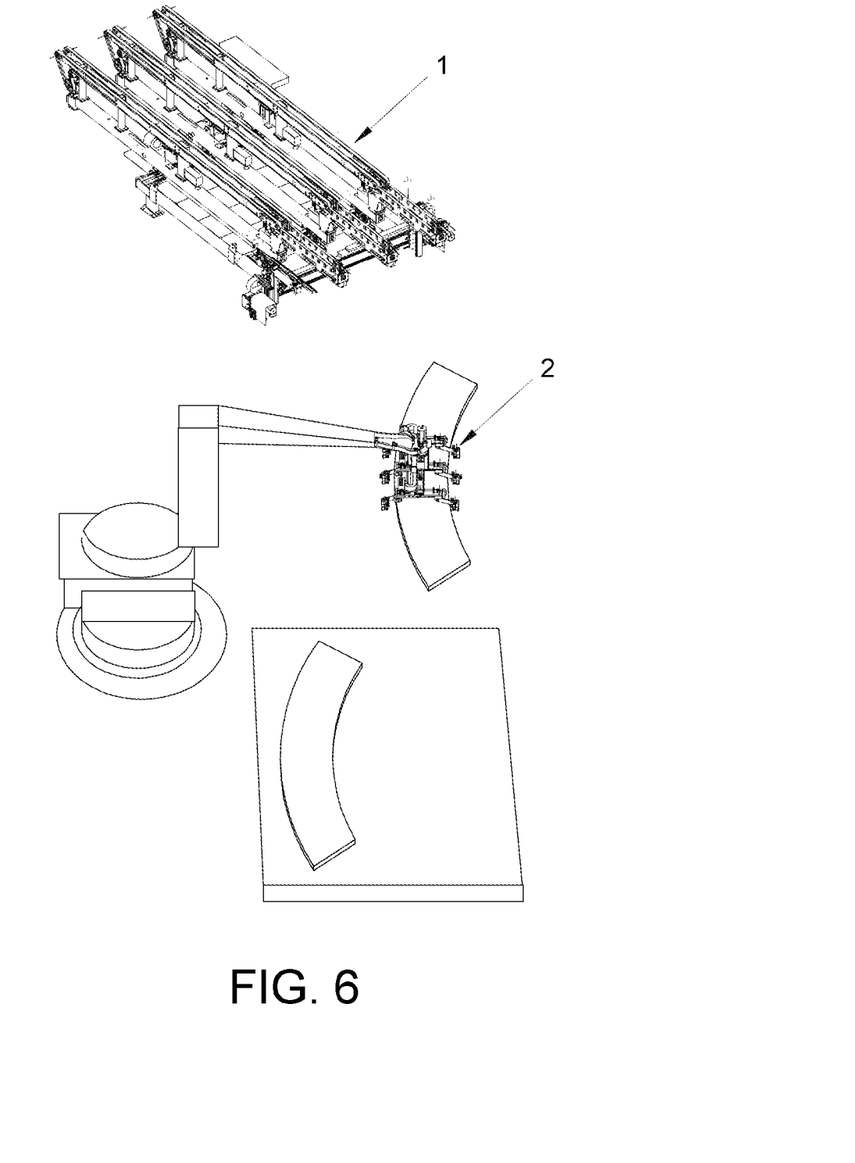
FIG. 6 shows a perspective view of the stacking device which is the object of the invention with the claw carrying a package of pieces collected from the pre-stacking table towards a pallet.

Both the pre-stacking table (1) and the claw (2) are connected to a computer or numerical control, which stores the different positions of the pliers (3) of the claw (2) of the support assemblies (13) and of the side centering devices (14) of the pre-stacking table (1), such that, based on the dimensions of the different pieces manufactured, the positions of these elements are automatically modified and such that the stacking of the manufactured pieces, whichever this piece be, does not require any manual mechanical changes, but achieving the automation of the change in the positions of the elements of the claw (2) and of the pre-stacking table (1).

The invention must not be limited to the embodiments described in this document. Those skilled in the art can develop other embodiments in view of the disclosure made herein. In consequence, the scope of the invention is defined by the claims that follow.

The invention claimed is:

1. A universal automated stacking device comprising:
   a pre-stacking table, configured to make a packet of pieces, comprising at least one support assembly attached to a chassis and at least one side centering device, configured to align the packet of pieces on the support assembly, combined with
   a claw comprising at least one pair of pliers attached to a frame that comprises a lower abutment and an upper abutment, attached by a pneumatic cylinder to modify a distance between the lower abutment and the upper abutment, the claw configured to pick the packet of pieces from the pre-stacking table and to create a stack on a pallet,
   wherein
   each support assembly is configured to displace along a guide of the chassis in order to adapt to different lengths of the pieces,
   each support assembly comprises a support arm, for the support of pieces, that further comprises two groups of support abutments configured to be positioned along said support arms to adapt to different widths of the pieces and contribute to the centering of each piece on the support arm,
   the at least one pair of pliers is fixed to the frame via an arm which is attached to a slide located in a crossbar that is in turn attached to a rail located in the lower part of the frame, the arms having a capacity of displacement along the slide and each crossbar having a capacity of displacement along the rail such that each of the pairs of pliers has a capacity of displacement along two directions to pick up pieces of irregular dimensions, in length and width, and also in height, by moving the upper and lower abutments, to pick up different sizes of packets of pieces.

2. The universal automated stacking device according to claim 1, wherein each support assembly comprises:
   a conveyor belt which comprises at least one belt, and
   a lower beam onto which both the conveyor belt and the support arm are supported, such that the support assemblies are attached to the guides via the lower beam and the support arm is a longitudinal extension of the conveyor belt for the support of pieces transferred from the conveyor belt.

3. The universal automated stacking device according to claim 1, further comprising engines to displace the support assemblies throughout along the guides.

4. The universal automated stacking device according to the claim 1, wherein the side centering devices comprise an attachment piece attached to a lead guide of the chassis, a thrust head and a lifting mechanism of the thrust head relative to the attachment piece.

5. The universal automated stacking device according to claim 4, wherein each side centering device is displaced throughout along the lead guide via an engine and a transmission system, to adapt the side centering devices to different lengths of the pieces.

* * * * *